Aug. 16, 1949.                G. BAER                2,479,291
              HINGED EYEPIECE HOLDER FOR CAMERA FINDERS
Filed Oct. 29, 1945                              2 Sheets-Sheet 1

Inventor
Georges Baer
By Glascock Downing &c
Attys

Aug. 16, 1949.                G. BAER                2,479,291
             HINGED EYEPIECE HOLDER FOR CAMERA FINDERS
Filed Oct. 29, 1945                              2 Sheets-Sheet 2

Inventor
Georges Baer

Patented Aug. 16, 1949

2,479,291

UNITED STATES PATENT OFFICE 2,479,291

HINGED EYEPIECE HOLDER FOR CAMERA FINDERS

Georges Baer, Paudex-Lausanne, Switzerland, assignor to Pignons S. A., Ballaigues, Switzerland, a corporation of Switzerland Application October 29, 1945, Serial No. 625,344
In Germany April 21, 1943

1 Claim. (Cl. 88—1.5)

This invention relates to hinged eyepiece holders for camera finders. A chief feature of the invention resides in that the eyepiece holder is mounted on its support by means of a hinge, an element of which has a helicoidal groove with which engages a catch dependent from a push-button adapted to slide in a slot of the support parallel to the axis of the hinge, so that actuation of the push-button in one or the other direction causes the eyepiece holder to be brought in position of rest or in working position.

The annexed drawing represents by way of example, an embodiment of the invention.

Figure 1:
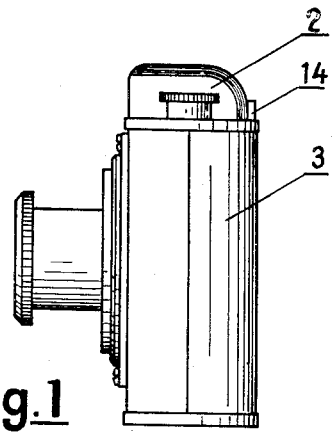
Fig. 1 is a general view showing the position of the eyepiece holder on a camera.

In the construction shown in the drawing, the eyepiece holder 1 is hingedly mounted on the edge of the casing 2 hinged itself to the edge of a casing 2 which is itself hinged on the edge of a camera 3.

Figure 2:
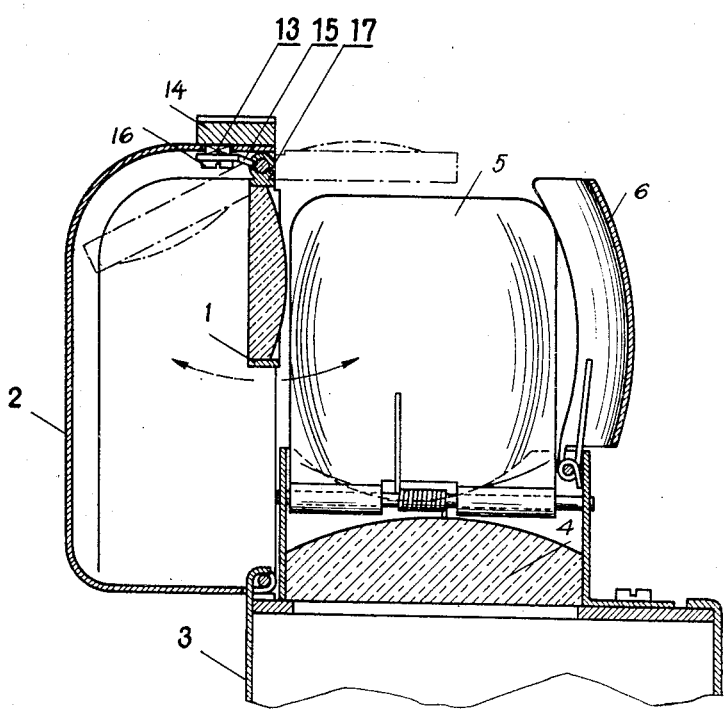
Fig. 2 is a cross-section of the eyepiece holder on enlarged scale.
Figure 3:
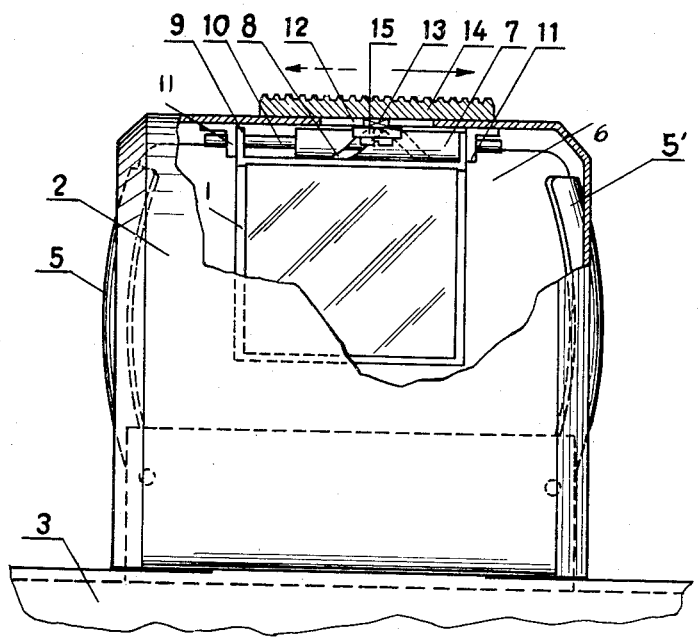
Fig. 3 is a front elevation with parts in section, with the casing of the eyepiece in open position and the eyepiece holder in middle position.
Figure 4:
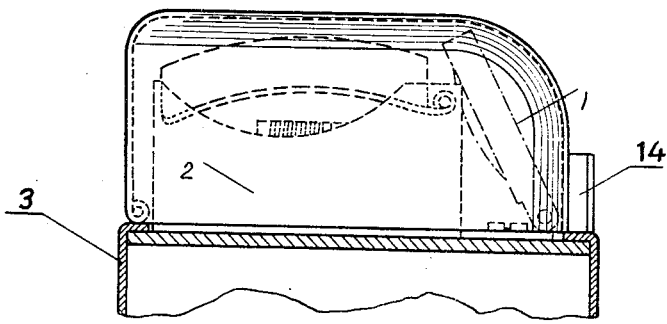
Fig. 4 is a side elevation, with the casing in closed position.

In working position as shown in the dotted right hand position of Fig. 2, the eyepiece faces a finder lens 4 mounted on the upper face of the camera and protected by spring urged shutters 5, 5' and 6 adapted to be turned down under the casing together with the latter.

The eyepiece holder presents a short hinge element 9 and a long hinge element 7 in which is cut a helicoidal groove 8. Both elements 7 and 9 are rotatably mounted on an axle 10 fixed to the casing by means of two ears 11.

The casing presents a slot 12 parallel to the axis of the hinge, in which slides freely the square catch 13 of a knurled push-button 14.

A finger 15 is fixed on the square catch 13 of the push-button 14 by means of a screw 16. This finger engages its extremity in the helicoidal groove 8 of the long hinge element 7 of the eyepiece holder.

This hinged eyepiece holder works as follows:

Upon opening of the casing 2, the lens protecting shutters open under the action of their springs. In order to bring the eyepiece holder into working position, it is sufficient to displace the push-button 14 from right to left, as shown by the arrow in full line; in order to bring the eyepiece holder back in closed position of the casing, it is sufficient to displace the push-button from left to right, as indicated by the arrow in dotted line. The finger 15 dependent upon the push-button and engaging its extremity in the groove of the long hinge element produces the desired rotation of the eyepiece holder. The form and extent of the helical groove 8 is such that during the movement of the button 14 from one position to the other the holder 1 is caused to swing through an angle of substantially 180° as shown by the two dotted line positions indicated in Figure 2.

What I claim is:

In a camera finder, a camera body, a casing hinged to the body, an eyepiece holder, a spirally grooved hinge member fixed to said holder, a shaft secured to said body and pivotally received by the hinge member to form a hinge mounting for the holder, a button slidably mounted on the casing, and a finger on said button engaging in said groove whereby during sliding movement of the button the holder is caused to swing through an angle of approximately 180° about said shaft.

GEORGES BAER.

REFERENCES CITED

The following references are of record in the file of this patent:

UNITED STATES PATENTS

| Number | Name | Date |
|---|---|---|
| 1,914,664 | Fear | June 20, 1933 |
| 1,980,546 | Petit et al. | Nov. 13, 1934 |
| 2,040,579 | Vinten | May 12, 1936 |
| 2,200,007 | Mihalyi | May 7, 1940 |
| 2,305,665 | Bolsey | Dec. 22, 1942 |

FOREIGN PATENTS

| Number | Country | Date |
|---|---|---|
| 533,742 | Germany | Sept. 17, 1931 |
| 414,225 | Great Britain | Aug. 2, 1934 |
| 447,742 | Great Britain | Feb. 27, 1935 |